J. O. HEINZE.
TRACTOR.
APPLICATION FILED AUG. 11, 1919.
1,369,923.
Patented Mar. 1, 1921.
2 SHEETS—SHEET 2.
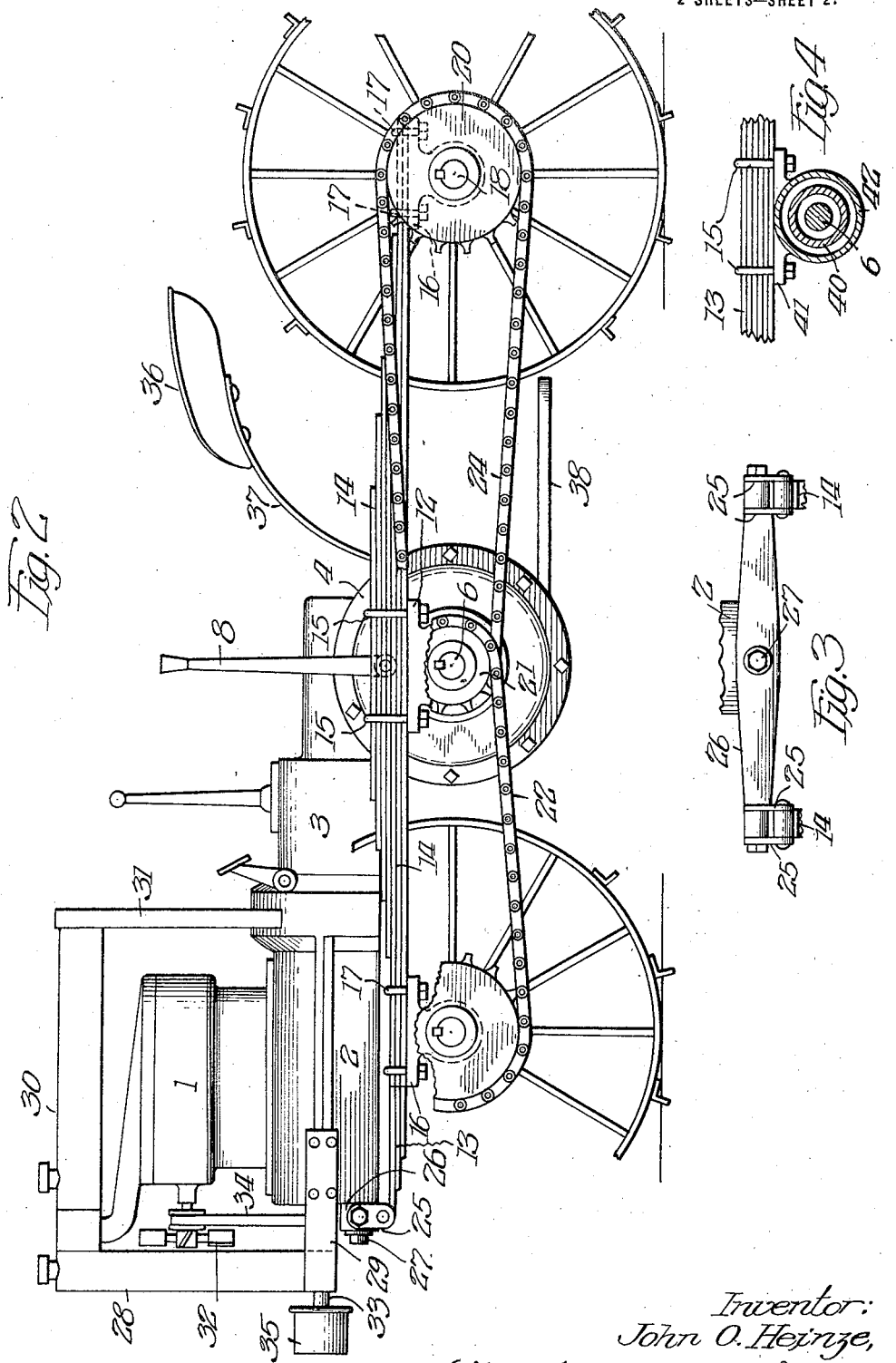
Inventor:
John O. Heinze,
By Offield, Towle, Graves & Soans.
Attys.

J. O. HEINZE.
TRACTOR.
APPLICATION FILED AUG. 11, 1919.
1,369,923.
Patented Mar. 1, 1921.
2 SHEETS—SHEET 1.
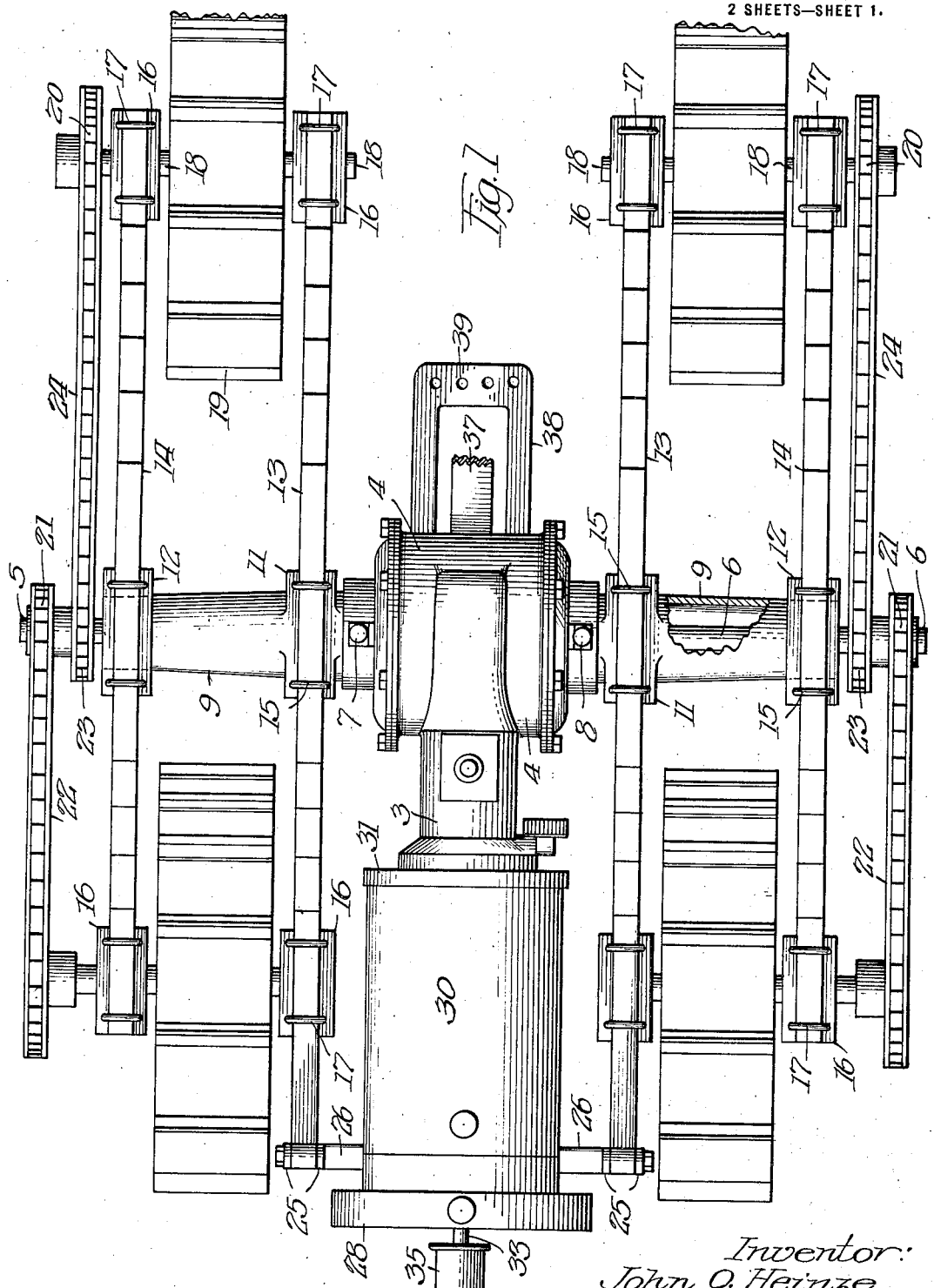
Inventor:
John O. Heinze,
By Offield, Towle, Graves & Soans
Attys.

UNITED STATES PATENT OFFICE.

JOHN O. HEINZE, OF BOYNE CITY, MICHIGAN, ASSIGNOR TO TRACTION ENGINE COMPANY, OF BOYNE CITY, MICHIGAN, A CORPORATION OF MICHIGAN.

TRACTOR.

1,369,923.     Specification of Letters Patent.     Patented Mar. 1, 1921.

Application filed August 11, 1919. Serial No. 316,867.

*To all whom it may concern:*

Be it known that I, JOHN O. HEINZE, a citizen of the United States, residing at Boyne City, in the county of Charlevoix and State of Michigan, have invented certain new and useful Improvements in Tractors, of which the following is the specification.

This invention relates to tractors of the general type commonly employed for drawing agricultural implements, and has reference more particularly to the manner of supporting the frame of the tractor on the ground wheels.

The principal objects of my invention are, to provide improved means for resiliently supporting the frame of the tractor on the ground wheels; to provide improved means affording extreme flexibility to yield in accordance with and absorb road shocks resulting from inequalities of the road surface; to provide a tractor in which the motor is effectively cushioned against jar and vibration; and in general to provide a simple and improved tractor of the general character described.

On the drawings, Figure 1 is a top or plan view of a tractor embodying my improvements.

Fig. 2, a side view thereof,

Fig. 3 a front view of the equalizer connection, whereby the front end of the motor is connected to the supporting springs of the vehicle, and Fig. 4, a sectional view of a pivotal mounting of the springs.

The general construction of this tractor is similar to that shown and described in my application, Serial No. 255,261, filed September 23, 1918, and has an engine or motor 1 with a crank case 2 having a rearwardly extending clutch and transmission case 3. In the illustrated construction the crank case and clutch and transmission case serve as the frame of the machine, although it is to be understood that a separate frame supporting these parts may be provided if desired. A differential housing 4 is connected to the rear end of the transmission case 3 and has a pair of laterally extending differential shafts 5 and 6 which are connected for operation from the motor, as for example, in the structure of the application above referred to, and have controlling levers 7 and 8 whereby said shafts may be selectively retarded or arrested.

A tubular housing 9 extends outwardly at each side of the differential housing 4, and has the respective shaft 5 or 6 extending through and journaled therein, and each housing 9 has a pair of spaced inner and outer spring seats 11 and 12 respectively, formed on the top thereof, and on the top of these seats are mounted, in parallel relation, forwardly and rearwardly extending multiple leaf springs 13 and 14 respectively. These springs are secured to the seats 11 and 12 by U-bolts 15, or other convenient fastening devices.

Each of the springs 13 and 14 have bearings 16 secured to their front and rear ends by means of the U-shaped clamp bolts 17 or in any other suitable manner, and each pair of bearings on the corresponding ends of the springs 13 and 14 has a shaft 18 journaled to rotate therein, and provided with a traction wheel 19, secured thereon intermediate of the bearings. Each of the shafts 18 is extended outwardly beyond the outer bearing 16 on the spring 14 and has a sprocket 20 secured thereon. Each of these sprockets is connected by means of a chain with the corresponding differential shaft 5 or 6, which have front wheel drive sprockets 21 mounted therein, and connected with the front sprocket 20 by means of chains 22 and rear wheel drive sprockets 23 thereon connected with the rear wheel sprockets 20 by means of chains 24, so that power is communicated from the differential shafts 5 and 6 to both the front and rear wheels.

The inner springs 13 are extended at their forward ends beyond the wheel bearings 16 and have said ends pivotally connected by means of links 25 with the opposite ends of an equalizer bar 26, which latter is centrally pivoted at 27 to the front of the crank case 2. This construction affords a resilient support for the tractor engine and permits either front wheel to yield readily without disturbing the position of the motor.

This tractor, like the structure in the application hereinbefore referred to has a radiator 28 mounted at the forward end of the engine by means of brackets 29, and has a combined water and fuel tank 30 extending rearwardly from the radiator and supported at the rear end by a brace 31. A fan 32 is mounted at the front of the engine just behind the radiator 28 and driven from the engine shaft 33 by belt 34, said engine shaft 33 being extended forwardly beyond the radiator 28 and provided with a jack pulley 35 for applying power to other implements if desired. These features of the construction merely represent a convenient form of construction which may be changed as the circumstances of the case may require.

A seat 36 is carried by a spring support 37 extending upwardly from the differential housing 4, so that the operator in the seat may readily operate the levers 7 and 8 which afford directional control to the tractor, as in the construction of the application above referred to, and there is also a yoke 38 extending rearwardly from the housing 4, and provided with a plurality of perforations 39 by which draft connection may be made with implements to be drawn by the tractor.

In Fig. 4 I have shown a construction in which the springs 13 and 14 are pivotally connected with the differential case to afford greater freedom of movement. To this end, the differential case 4 has a tubular housing 40 extending laterally at each side thereof, in which the differential shafts 5 and 6 are journaled as in the construction previously described. The spring seats 41, however, are not formed rigid with the housing extension 40 as in the previous construction, but a sleeve 42 is mounted to oscillate on each housing extension 40 and the seats 41 for the springs formed on this sleeve, so as to permit each pair of springs to swing together and thereby afford greater flexibility to the structure.

While I have shown and described my invention in a preferred form, I am aware that various changes and modifications may be made without departing from the principles of my invention, the scope of which is to be determined by the appended claims.

I claim as my invention:

1. In a tractor, the combination of front and rear supporting wheels having a spring extending therebetween, a frame supported on said spring intermediate of the front and rear wheels, a motor on the frame adapted to impart propelling power to the front and rear wheels of the tractor, and a support for the motor at the extremity of the spring.

2. In a tractor, the combination of front and rear supporting wheels, a pair of springs extending longitudinally of the tractor and having the said front and rear wheels journaled therebetween at the opposite ends thereof, a frame mounted on said springs intermediate of the front and rear wheels, a motor carried by the said frame for propelling the tractor, and a support for the motor at the extremity of the spring.

3. In a tractor, the combination of front and rear supporting wheels, a pair of springs extending longitudinally of the tractor and having the said front and rear wheels journaled therebetween at the opposite ends thereof, a frame having a fixed connection with said springs intermediate of the front and rear wheels, a motor carried by the said frame for propelling the tractor, and a support for the motor at the extremity of the spring.

4. In a tractor, the combination of front and rear supporting wheels, a pair of springs extending longitudinally of the tractor and having said front and rear wheels journaled therebetween at the forward and rear ends respectively of the springs, a bearing carried by the springs intermediate of the front and rear wheels, a frame mounted on the bearing and connected at a distance from the bearing with an end of one of the springs, and a motor on the frame for operating said wheels.

5. In a tractor, the combination of a motor, a differential mechanism operated by the motor and having a pair of differential shafts extending laterally therefrom, a casing for the differential having a tubular housing extending outwardly from each side thereof and inclosing the respective differential shaft, a pair of springs spaced laterally on each housing, and each extending forwardly and rearwardly therefrom, bearings at the front and rear ends of the springs having traction wheels journaled therein, driving connections for the differential shafts for operating the traction wheels, and means for resiliently supporting the end of the motor distant from the differential mechanism.

6. In a tractor, the combination of front and rear supporting wheels, springs extending between said wheels and having flexible extensions at one end, and a motor mounted on the extensions and intermediate portions of the springs and adapted to impart propelling power to the wheels.

7. In a tractor, the combination of a pair of laterally spaced, longitudinally extending springs, a motor between and mounted on intermediate and end portions of the springs, a pair of supporting wheels connected with the springs intermediate of the points of attachment of the motor therewith, a pair of supporting wheels at the other ends of the pair of springs, and connections for operating the supporting wheels from the motor.

8. In a tractor, the combination of a pair of spaced springs having supporting wheels at one end, a motor supported on the other ends of the springs at longitudinally spaced points, a pair of supporting wheels connected with the springs between said points, and connections for operating the supporting wheels from the motor.

9. In a tractor, the combination of front and rear pairs of supporting wheels, longitudinally extending springs connecting the front and rear supporting wheels and having extensions at one end, a resilient support extending between and connecting said extensions, a motor having one end mounted on the resilient support and the other end connected with intermediate portions of the springs, and connections for operating the supporting wheels from the motor.

10. In a tractor, the combination of front and rear supporting wheels, springs extending between and connecting the front and rear wheels, and a motor having the ends thereof connected with the springs, so that the latter tend to equalize the vertical displacement of the ends of the motor.

JOHN O. HEINZE.